(12) United States Patent
Tornaghi (10) Patent No.: US 7,043,284 B2
(45) Date of Patent: May 9, 2006

(54) INTEGRATED CELLULAR PHONE, DIGITAL CAMERA, AND PDA, WITH SWIVEL MECHANISM PROVIDING ACCESS TO THE INTERFACE ELEMENTS OF EACH FUNCTION

(75) Inventor: Barbara Tornaghi, Monza (IT)

(73) Assignee: Flextronics AP, LLC, Niwot, CO (US)

( * ) Notice: Subject to any disclaimer, the term of this patent is extended or adjusted under 35 U.S.C. 154(b) by 0 days.

(21) Appl. No.: 10/772,886

(22) Filed: Feb. 4, 2004

(65) Prior Publication Data

US 2004/0185921 A1    Sep. 23, 2004

Related U.S. Application Data

(60) Provisional application No. 60/445,939, filed on Feb. 6, 2003.

(51) Int. Cl.
*H04M 1/00* (2006.01)

(52) U.S. Cl. ............... 455/575.1; 455/575.3; 455/425

(58) Field of Classification Search ............ 455/90.3, 455/575.1, 575.4; D14/138, 140, 240, 248
See application file for complete search history.

(56) References Cited

U.S. PATENT DOCUMENTS

| | | | |
|---|---|---|---|
| 4,249,734 A | 2/1981 | Bromley | 273/94 |
| D297,735 S | 9/1988 | Soren et al. | D14/64 |
| D326,091 S | 5/1992 | Kikuchi | D14/138 |
| 5,189,632 A | 2/1993 | Paajanen et al. | 364/705.05 |
| 5,278,779 A | 1/1994 | Conway et al. | 364/708.1 |
| 5,644,338 A | 7/1997 | Bowen | 345/168 |
| D382,545 S | 8/1997 | Imai et al. | D14/100 |
| 5,907,615 A | 5/1999 | Kaschke | 379/433 |
| 5,991,644 A | 11/1999 | Ogawa | 455/566 |
| 6,297,752 B1 | 10/2001 | Ni | 341/22 |
| 6,466,202 B1 | 10/2002 | Suso et al. | 345/169 |
| 6,510,325 B1 | 1/2003 | Mack, II et al. | 455/550 |
| 6,542,354 B1 | 4/2003 | Holtorf et al. | 361/680 |
| 6,542,721 B1 | 4/2003 | Boesen | 455/90 |
| 6,580,932 B1 | 6/2003 | Finke-Anlauff | 455/575 |
| 6,628,508 B1 | 9/2003 | Lieu et al. | 361/680 |
| 6,658,272 B1 * | 12/2003 | Lenchik et al. | 345/164 |
| 6,661,404 B1 | 12/2003 | Sirola et al. | 345/168 |
| D487,066 S | 2/2004 | Gartrell et al. | D14/138 |
| 6,731,912 B1 * | 5/2004 | Miyashita | 455/90.2 |
| 6,748,242 B1 | 6/2004 | Dunleavy | 455/566 |
| 6,766,182 B1 * | 7/2004 | Janninck et al. | 455/575.3 |
| 6,801,796 B1 | 10/2004 | Finke-Anlauff | 455/575.3 |

(Continued)

FOREIGN PATENT DOCUMENTS

JP    10-215304    1/1998

(Continued)

*Primary Examiner*—Joseph Feild
*Assistant Examiner*—S. Smith
(74) *Attorney, Agent, or Firm*—Haverstock & Owens LLP (57) ABSTRACT

A wireless telecommunications device, including a telephone interface, a keyboard and a digital camera lens, utilizes a single mechanical transformation in the form of a swivel mechanism to allow the user to switch from one mode to another for portability and easy accessibility. Preferably, when configured in a first position, the wireless telecommunications device operates in the first mode. When configured in a second position, the wireless telecommunications device operates in the second mode. When configured in a third position, the wireless telecommunications device operates in a third mode. The first mode is a telephone mode. The second mode is a keyboard mode. The third mode is a camera mode.

5 Claims, 8 Drawing Sheets

U.S. PATENT DOCUMENTS

| | | |
|---|---|---|
| 2002/0006815 A1 | 1/2002 | Finke-Anlauff ............. 455/575 |
| 2002/0102946 A1* | 8/2002 | SanGiovanni ................ 455/90 |
| 2002/0190952 A1 | 12/2002 | Shah .......................... 345/163 |
| 2003/0087663 A1 | 5/2003 | Finke-Anlauff ............. 455/550 |
| 2003/0211874 A1* | 11/2003 | Mizuta et al. ........... 455/575.4 |
| 2004/0121825 A1* | 6/2004 | Ma et al. ................. 455/575.4 |
| 2004/0121826 A1* | 6/2004 | Ma et al. ................. 455/575.4 |
| 2005/0017953 A1 | 1/2005 | Pekka ........................ 345/169 |
| 2005/0020323 A1 | 1/2005 | Kim ........................ 455/575.1 |

FOREIGN PATENT DOCUMENTS

| | | |
|---|---|---|
| JP | P2002-158518 A | 11/2000 |

\* cited by examiner

INTEGRATED CELLULAR PHONE, DIGITAL CAMERA, AND PDA, WITH SWIVEL MECHANISM PROVIDING ACCESS TO THE INTERFACE ELEMENTS OF EACH FUNCTION

RELATED APPLICATIONS

This application claims priority under 35 U.S.C. § 119(e) of the co-pending U.S. provisional application Ser. No. 60/445,939 filed on Feb. 6, 2003 and entitled "INTEGRATED CELLULAR PHONE, DIGITAL CAMERA, AND PDA, WITH SWIVEL MECHANISM PROVIDING ACCESS TO THE INTERFACE ELEMENTS OF EACH FUNCTION AND MAIN MENU NAVIGATION PRINCIPLE FOR MOBILE PHONE USER." The provisional application Ser. No. 60/445,939 filed on Feb. 6, 2003 and entitled "INTEGRATED CELLULAR PHONE, DIGITAL CAMERA, AND PDA, WITH SWIVEL MECHANISM PROVIDING ACCESS TO THE INTERFACE ELEMENTS OF EACH FUNCTION AND MAIN MENU NAVIGATION PRINCIPLE FOR MOBILE PHONE USER" is also hereby incorporated by reference.

FIELD OF THE INVENTION

The present invention relates to the field of cellular phones. More particularly, the present invention relates to the field of integrating a cellular phone, a digital camera lens, and a keyboard into a portable handheld device.

BACKGROUND OF THE INVENTION

Cellular telephones have become an increasingly popular means of communication for today's mobile society. Also, digital camera lenses have been added as a feature on certain commercial cellular telephones, to allow users to communicate and exchange information through pictures. Further, personal digital assistant interfaces have been added on some cellular telephone devices, which allow cellular telephone users to access the web, answer e-mail, and organize appointments. However, conventional multifunction cellular telephones are bulky, complicated, and not user-friendly. Furthermore, conventional multifunction cellular telephones do not allow easy access to all functions through a single mechanical transformation. Due to these problems, conventional multifunction cellular telephones are cumbersome and ill-equipped to handle the multitasking needs of the average cellular telephone user.

What is needed is a multifunction cellular telephone, which successfully integrates a cellular telephone interface with a digital camera lens and a keyboard into one user-friendly portable handheld device. Specifically, to address the problems noted above, what is needed is a multifunction cellular telephone that allows a user to switch from one mode to another mode, utilizing a single mechanical transformation.

SUMMARY OF THE INVENTION

Embodiments of the present invention include an electronic device comprising a first substantially planar panel including a first interface, the first panel having a first axis of rotation perpendicular to the first panel; and a second substantially planar panel including a second interface, the second panel having a second axis of rotation perpendicular to the second panel and rotatably joined to the first panel such that the first axis of rotation and the second axis rotation are co-linear. In a first position, the second interface is obscured by the first panel and in a second position the second interface is exposed. The first panel of the electronic device further includes a display. When the device is configured in the first position, the first interface controls the display and the device. When the device is configured in the second position, the second interface controls the display and the device. Alternatively, when the device is configured in the second position, both interfaces control the display and the device. When the device is configured in the first position, an entry made on the first interface is displayed on the display. When the device is configured in the second position, an entry made on the second interface is displayed on the display. Alternatively, when the device is configured in the second position, entries made on both interfaces are displayed on the display.

The electronic device operates in a first mode when it is configured in the first position. Alternatively, the electronic device operates in a second mode when it is configured in the second position. Preferably, the first panel of the electronic device is operatively coupled to the second panel to allow an exchange of electronic data. Preferably, the electronic device is a handheld portable device.

According to another embodiment of the invention, the first panel of the electronic device further comprises a front side and a back side, wherein the front side of the first panel includes the display and the first interface, and the back side of the first panel includes an engaging end. The second panel further comprises a receiving end. Alternatively, the first panel further comprises a front side and a back side. The front side of the first panel includes the display and the first interface, and the back side of the first panel includes a receiving end. The second panel further comprises an engaging end. In either alternative embodiment, the receiving end receives the engaging end when the device is configured in a position.

In another aspect of the invention, a wireless telecommunications device comprises: a first panel including a front side and a back side, wherein the front side further comprises a display and a telephone interface, the first panel having a first axis of rotation; a second panel including a keyboard, the second panel having a second axis of rotation, the second panel rotatably coupled to the first panel such that in a first position the keyboard is obscured by the first panel, and in a second position the keyboard is exposed, wherein in the first position an entry made on the telephone interface is displayed on the display and in the second position an entry made on the keyboard is displayed on the display; and a digital camera lens mounted to a surface of the back side of the first panel, such that in a first position the camera lens is obscured by the second panel, and in a third position the camera lens is exposed. According to another embodiment of the invention, when the wireless telecommunications device is in the second position, entries made on both the keyboard and the telephone interface are displayed on the display. According to yet another embodiment of the invention, when the wireless telecommunications device is in the third position, the keyboard is obscured.

According to one embodiment of the present invention, the second panel of the wireless telecommunications device rotates in a first direction from the first position toward the second position and the third position. Alternatively, the second panel rotates in a first direction from the first position toward the second position and in a second direction from the first position toward the third position, wherein the second direction is opposite to the first direction.

Preferably, the wireless telecommunications device operates in a first mode when configured in the first position, operates in a second mode when configured in the second position, and operates in a third mode when configured in the third position. Preferably, the first mode is a telephone mode, the second mode is a keyboard mode, and the third mode is a camera mode. Preferably, the keyboard is a qwerty keyboard. Alternatively, the keyboard can be arranged alphabetically or according to some other convenient arrangement. According to the preferred embodiment of the invention, when the device is configured in the second position, the second panel is rotated about 180 degrees from the first panel.

According to another embodiment, when the wireless telecommunications device is in the third position, a button in the telephone interface is configured to operate a digital camera operatively coupled to the camera lens.

According to another embodiment of the invention, the first panel of the wireless telecommunication device further comprises a front side and a back side. The front side of the first panel includes the display and the first interface, and the back side of the first panel includes an engaging end. The second panel further comprises a receiving end. When the wireless telecommunications device is in one of the first position, the second position, and the third position, the receiving end receives the engaging end.

According to another embodiment of the invention, the first panel further comprises a front side and a back side, wherein the front side of the first panel includes the display and the first interface, and the back side of the first panel includes a receiving end. The second panel further comprises an engaging end. When the wireless telecommunications device is in one of the first position, the second position, and the third position, the receiving end receives the engaging end.

BRIEF DESCRIPTION OF THE DRAWINGS

FIG. 1A shows one embodiment of the invention with the numeric keypad arranged in concentric circles. FIG. 1B illustrates an alternative embodiment, with the numeric keypad in the conventional twelve key arrangement.

FIGS. 9A and 9B show side views of the device in the first position. FIG. 9C show the device in the second position.

DETAILED DESCRIPTION OF THE PRESENT INVENTION

An embodiment of the present invention is an electronic device comprising: a first substantially planar panel including a first interface, the first panel having a first axis of rotation perpendicular to the first panel; and a second substantially planar panel including a second interface, the second panel having a second axis of rotation perpendicular to the second panel and rotatably joined to the first panel such that the first axis of rotation and the second axis rotation are co-linear. In a first position the second interface is obscured by the first panel and in a second position the second interface is exposed.

The first panel of the electronic device further includes a display. When the device is configured in the first position, the first interface controls the display. Alternatively, when the device is configured in the second position the second interface controls the display. According to one embodiment of the present invention, the first panel includes a display, such that when the device is configured in the first position, an entry made on the first interface is displayed on the display. When the device is configured in the second position, an entry made on the second interface is displayed on the display. Alternatively, when the device is configured in the second position, entries made on both the first interface and the second interface are displayed on the display. According to another embodiment of the present invention, the device operates in a first mode when configured in the first position and operates in a second mode when configured in the second position.

In one embodiment of the invention, the first panel is operatively coupled to the second panel to allow an exchange of electronic data. In another embodiment of the invention, the device is a portable handheld device.

In yet another embodiment of the invention, the first panel further comprises a front side and a back side, wherein the front side of the first panel includes the display and the first interface, and the back side of the first panel includes an engaging end. The second panel further comprises a receiving end. Alternatively, the first panel further comprises a front side and a back side, wherein the front side of the first panel includes the display and the first interface, and the back side of the first panel includes a receiving end. The second panel further comprises an engaging end. In either alternative embodiment, when the device is configured in the first position, the second position, or the third position, the receiving end receives the engaging end.

The preferred embodiment of the present invention is a wireless telecommunications device comprising a first panel including a display and a telephone interface having a first axis of rotation; a second panel including a keyboard, having a second axis of rotation, such that the first axis of rotation and second axis of rotation are co-linear, and the second panel is rotatably joined to the first panel, and a digital camera lens.

The mode of the device is dependent on the configuration of the device. In the preferred embodiment of the present invention, when the device is configured in a first position, the device operates in a telephone mode. In the first position, the digital camera lens and the keyboard are obscured. Preferably, when the device is configured in a second position, the device operates in a keyboard mode. Thus, when the device is in the second position, the keyboard is exposed. When the device is configured in a third position, the device operates in a camera mode. In the third position, the camera is exposed. Preferably, in the third position, the keyboard is obscured.

Figure 1A:
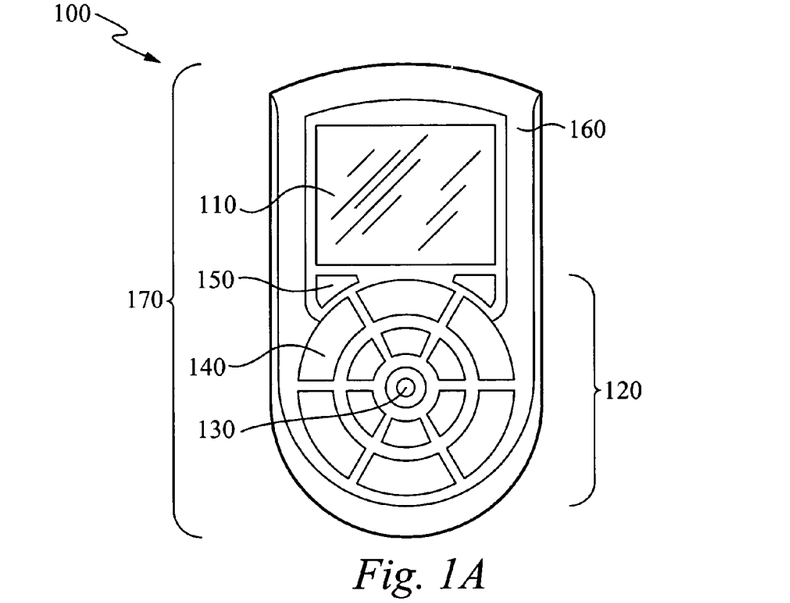
FIGS. 1A and 1B are schematic drawings illustrating the front side of the first panel of the electronic device, which includes the display and the telephone interface, in accordance with the present invention.
Figure 1B:
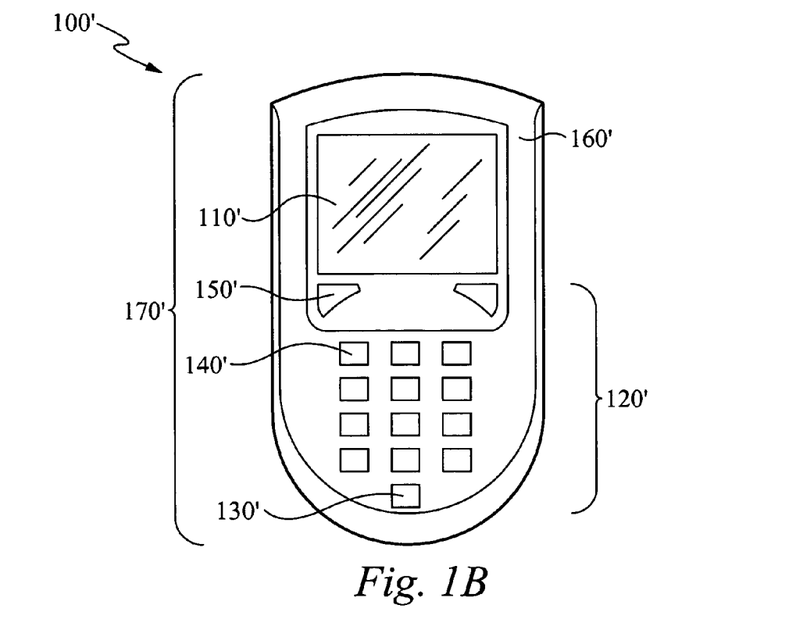
Figure 3:
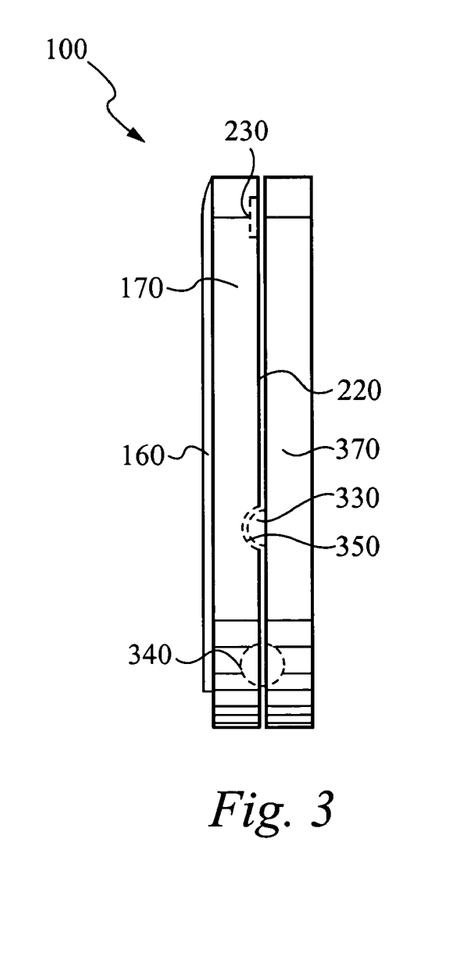
FIG. 3 is a side view of the first panel and the second panel, while the device is configured in the first position, in accordance with the present invention.

FIGS. 1A and 1B illustrate a wireless telecommunications device 100, 100' in a first position. The device 100, 100' comprises a first panel 170, 170' which includes a display 110, 110' and a telephone interface 120, 120'. Both FIGS. 1A and 1B also show a front side 160, 160' of the first panel 170, 170'. The first panel 170, 170' is rotatably mounted over a second panel 370 (FIG. 3). In the preferred embodiment, the telephone interface 120, 120' further includes a control button 130, 130', a numeric keypad 140, 140', and function keys 150, 150'. The control button 130, 130' can be configured to operate as a joystick or enter key. When the device 100, 100' is configured in the first position, an entry made on the telephone interface 120, 120' is displayed on the display 110, 110'. The numeric keypad 140 can be arranged in concentric circles (FIG. 1A) with a control button 130. Alternatively, the numeric keypad 140' can be arranged in the conventional twelve key arrangement (FIG. 1B), with a control button 130'.

Figure 2:
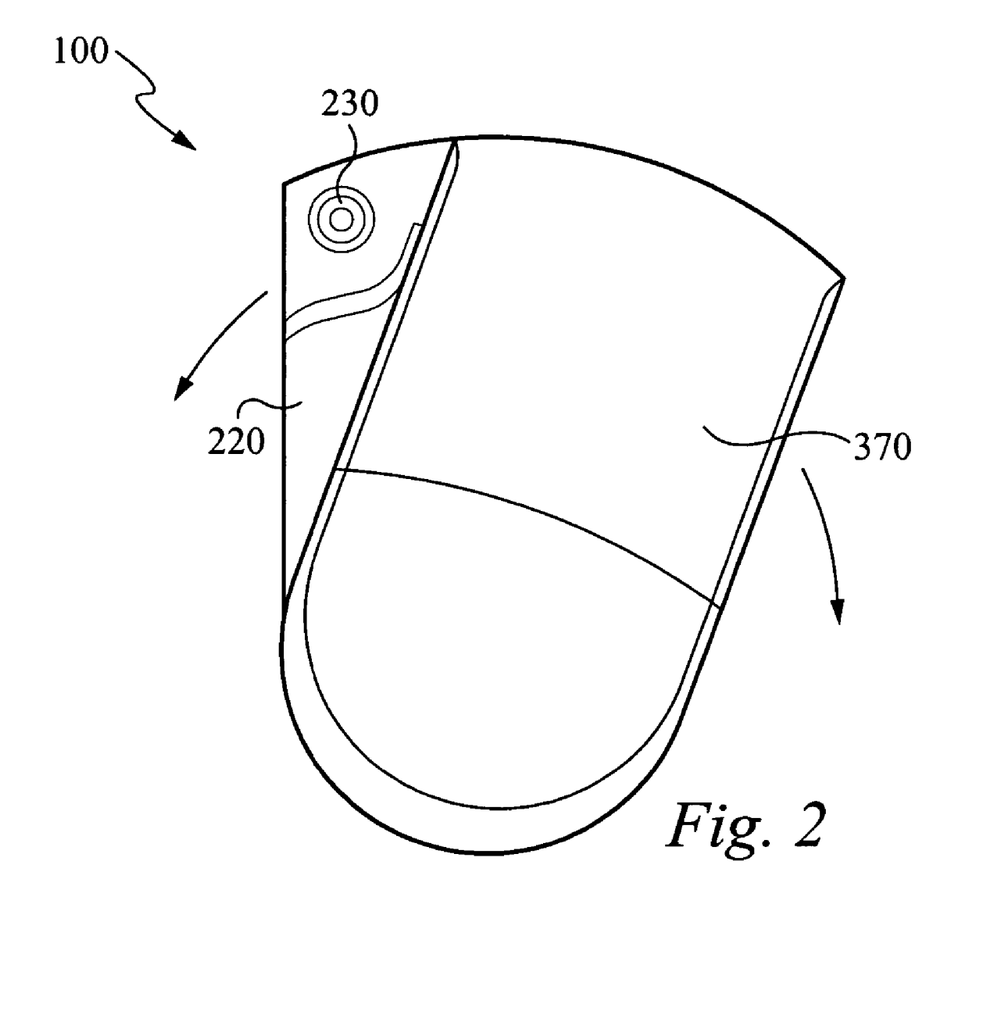
FIG. 2 is a schematic drawing illustrating the device configured in the third position, in which the digital camera lens is exposed, in accordance with the present invention.

FIG. 2 illustrates the back view of the wireless telecommunications device 100 in the third position. As shown in FIG. 3, the telecommunications device 100 is configured to the third position by rotating the first panel 170 and the second panel 370 relative to each other about an axis of rotation 340. The first panel 170 (FIG. 3) of the device 100 has a back side 220 which includes a digital camera lens 230. As shown in FIGS. 1A and 1B, when the device 100, 100' is configured in the first position, the digital camera lens 230 (FIG. 2) is obscured. But, as shown in FIG. 2, when the telecommunications device 100 is configured in the third position, the digital camera lens 230 is exposed. When the telecommunications device 100 is configured in the third position, the display 110, 110' (FIGS. 1A and 1B) shows what the digital camera lens 230 (FIG. 2) sees. A user can then press a designated button on the telephone interface 120, 120' (FIGS. 1A and 1B). The designated button is configured to operate a digital camera which is operatively coupled to the digital camera lens 230 (FIG. 2). Preferably, the designated button is the control button 130'.

FIG. 3 is a side view of the telecommunications device 100 in the first position. According to the preferred embodiment, the first panel 170 comprises a front side 160 and a back side 220. The back side 220 of the first panel 170 further comprises the digital camera lens 230. According to the preferred embodiment of the present invention, when the device 100 is configured in the first position, the digital camera lens 230 is obscured by the second panel 370. Furthermore, the first panel 170 is rotatably joined to the second panel 370 at an axis of rotation 340.

FIG. 3 further illustrates that the back side 220 of the first panel 170 comprises one or more receiving ends 350. The engaging end 330 and the receiving end 350 are arranged positively when the device is configured in any position. Preferably, the engaging end 330 and the receiving end 350 are arranged positively when the device is configured in the first position, in the second position, or in the third position. Furthermore, any convenient sensor can signal to the device when the device is configured in the first position, in the second position or in the third position.

Figure 4:
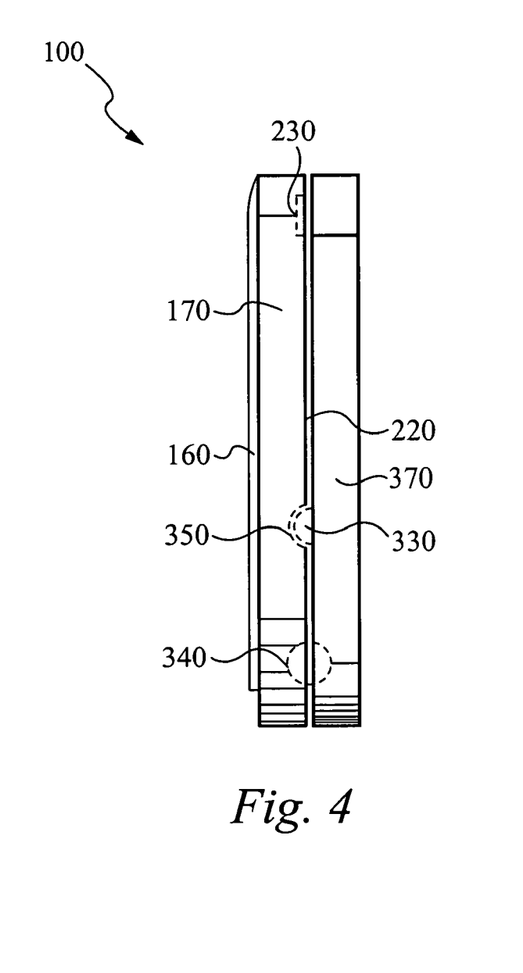
FIG. 4 is a side view of the first panel and the second panel, while the device is configured in the third position, in accordance with the present invention.

FIG. 4 is a side view of the telecommunications device 100 in the third position. According to the preferred embodiment of the invention, the third position is also known as a camera mode. In the third position, the first panel 170 comprises a front side 160 and a back side 220. The back side 220 of the first panel 170 further comprises a digital camera lens 230 and a receiving end 350. The first panel 170 is rotatably joined to the second panel 370 by an axis of rotation 340. The second panel 370 further comprises an engaging end 330. When the device 100 is configured in the third position, the receiving end 350 receives the engaging end 330.

Figure 5:
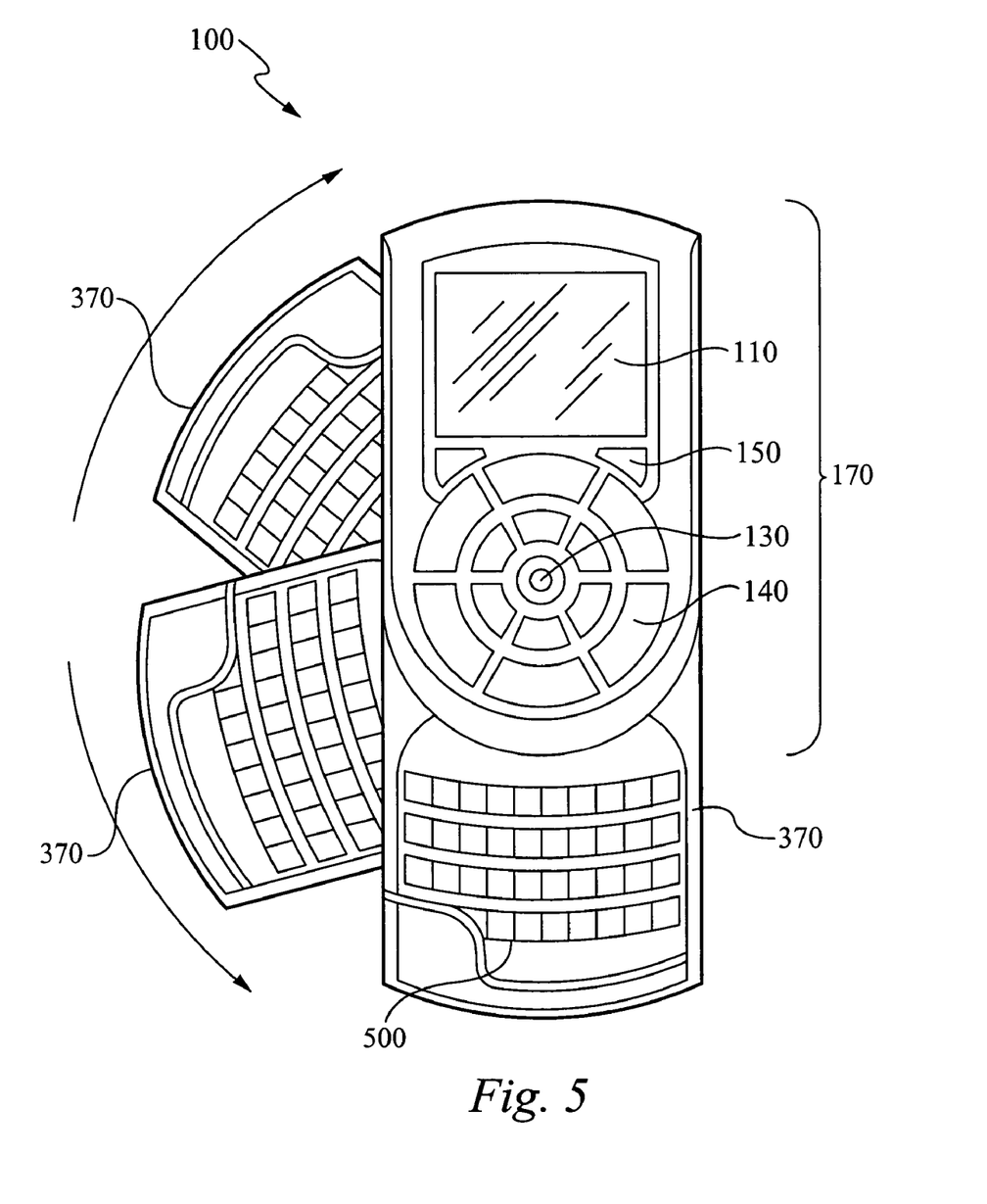
FIG. 5 is a schematic drawing showing the device configured in the second position, in which the keyboard is exposed, and several intermediate views, in accordance with the present invention.

FIG. 5 is a pictorial illustrating the wireless telecommunications device 100 configured in the second position. Preferably, when the device 100 is configured in the second position, the device 100 operates in a keyboard mode. According to the preferred embodiment of the present invention, the second panel 370 includes a keyboard 500. The first panel 170 includes a display 110, function keys 150, a control button 130, and a numeric keypad 140. When the user completely rotates the second panel 370 to 180 degrees in relation to the first panel 170, the telecommunications device 100 is configured in the second position. Thus, when the device 100 is configured in the first position or the third position, the keyboard 500 is obscured, whereas when the device 100 is configured in the second position, the keyboard 500 is exposed. Also, when the device 100 is configured in the second position, an entry made on the keyboard 500 is displayed on the display 110 of the first panel 170. Alternatively, when the device 100 is configured in the second position, entries made on both the keyboard 500 and the telephone interface 120, 120' (FIGS. 1A and 1B) are displayed on the display 110. Furthermore, as previously described, the second panel 370 comprising the keyboard 500 is rotatably joined to the first panel 170, thus allowing a user to switch from the first mode (telephone mode as shown in FIGS. 1A and 1B) to the second mode (keyboard mode as shown in FIG. 5) by rotating the second panel 370 of the device 100 180 degrees in relation to the first panel 170.

Figure 6A:
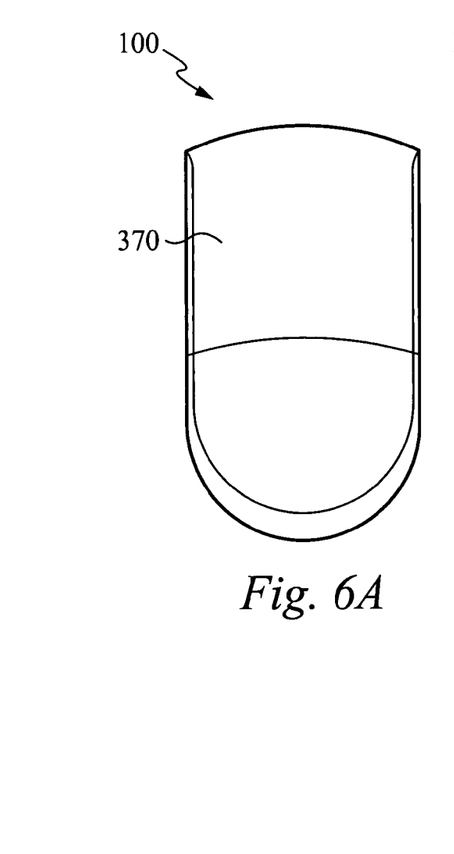
FIGS. 6A, 6B, and 6C are schematic drawings illustrating the device shifting from the first position (FIG. 6A) to the third position (FIG. 6B) in a first direction, and then from the first position (FIG. 6A) to the second position (FIG. 6C), in a second direction opposite from the first direction, in accordance with the present invention.
Figure 6B:
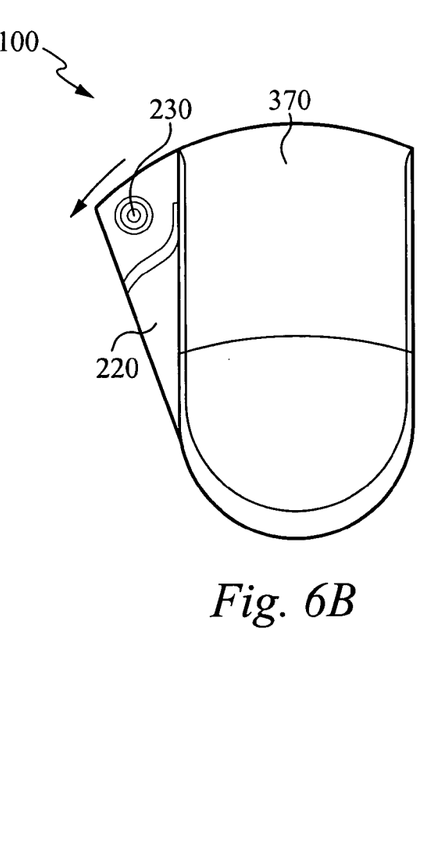
Figure 6C:
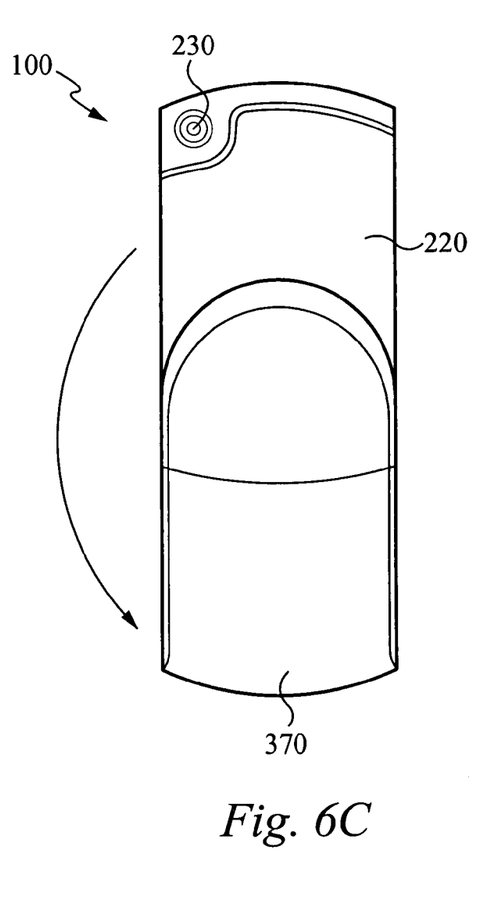

FIGS. 6A, 6B, and 6C show the device 100 shifting from the first position (FIG. 6A) to the third position (FIG. 6B), in a first direction, and then from the first position (FIG. 6A) to the second position (FIG. 6C), in a second direction opposite from the first direction. FIGS. 6A, 6B, and 6C illustrate the device 100 from a back view. According to the preferred embodiment of the present invention, as shown in FIG. 6A, the wireless telecommunications device 100 is configured in the first position when the keyboard 500 (FIG. 5) and the digital camera lens 230 (FIG. 2) are obscured by the second panel 370. As previously described, when the device 100 is configured in the first position, the device 100 operates in the telephone mode.

Next, FIG. 6B is a pictorial showing the device 100 configured in the third position. According to the preferred embodiment of the invention, the back side 220 of the first panel 170 (FIG. 3) further comprises a digital camera lens 230. In the third position, the digital camera lens 230 is exposed and is no longer obscured by the second panel 370. As described previously, the configuration of the device 100 enables for a user to switch from one mode to another. Thus, a user can switch from the telephone mode to the camera mode, by reconfiguring the device 100 from the first position (FIG. 6A) to the third position (FIG. 6B) in a first direction.

FIG. 6C shows the preferred embodiment of the invention of the second position, where the second panel 370 including a keyboard 500 is rotated 180 degrees from the first position (FIG. 6A). Referring to FIG. 5, when the device 100 is configured in the second position, an entry made on the keyboard 500 is displayed on the display 110. Preferably, the keyboard 500 is a qwerty keyboard. Now referring to FIG. 6C, when the telecommunications device 100 is configured in the second position, the device 100 operates in the second mode, which is a keyboard mode, in accordance with the preferred embodiment. Thus, a user can switch from the telephone mode to the keyboard mode, by rotating the second panel 370 from the first position (FIG. 6A) to the second position (FIG. 6C), in a second direction. In the preferred embodiment, the second direction is opposite from the first direction taken to switch the device 100 from the first position (FIG. 6A) to the second position (FIG. 6B).

Figure 7A:
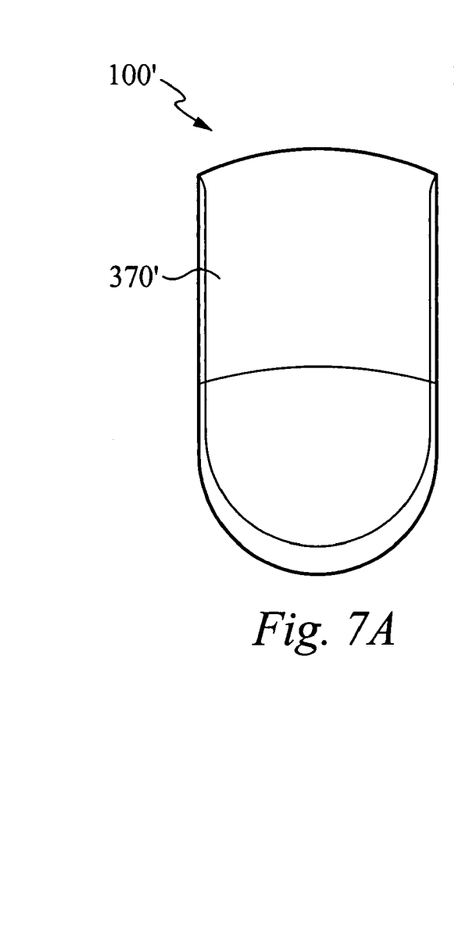
FIGS. 7A, 7B, and 7C are schematic drawings showing the device shifting from the first position (FIG. 7A) to the third position (FIG. 7B), and from the first position (FIG. 7A) to the second position (FIG. 7C), all in one direction, in accordance with the present invention.
Figure 7B:
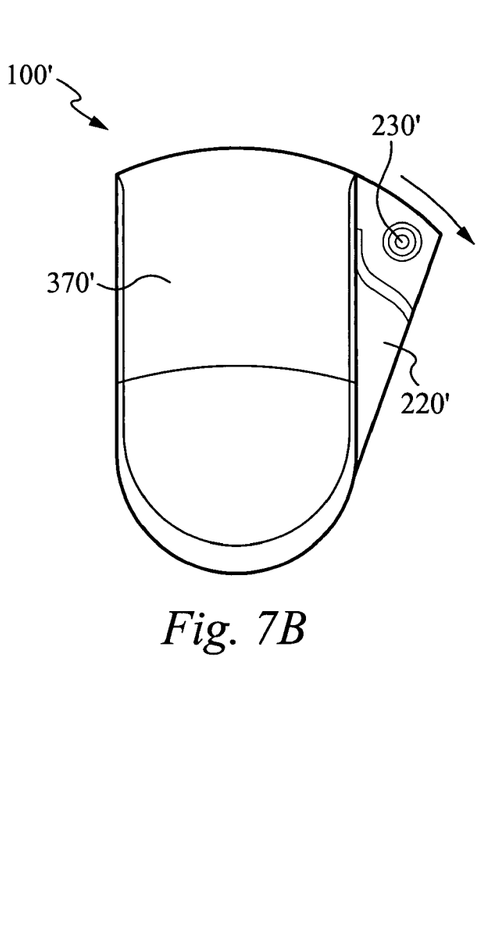

In contrast with FIGS. 6A, 6B, and 6C, FIGS. 7A, 7B, and 7C are pictorials illustrating the change of the device 100' configurations from the first position (FIG. 7A), to the third position (FIG. 7B), and finally the second position (FIG. 7C), all in the same direction. As shown in FIG. 7A, when the device 100' is in the first position, the second panel 370' obscures the keyboard 500 (FIG. 5) and the digital camera lens 230' (FIG. 7B). Then, when the user rotates the second panel 370' in a first direction, as shown in FIG. 7B, the digital camera lens 230' on the back side 220' of the first panel 170 (FIG. 3) is exposed. FIG. 7B shows the device 100' configured in the third position. Preferably, when the device 100' is configured in the third position, the telecommunications device 100' operates in the camera mode and the keyboard 500 (FIG. 5) is obscured.

Figure 7C:
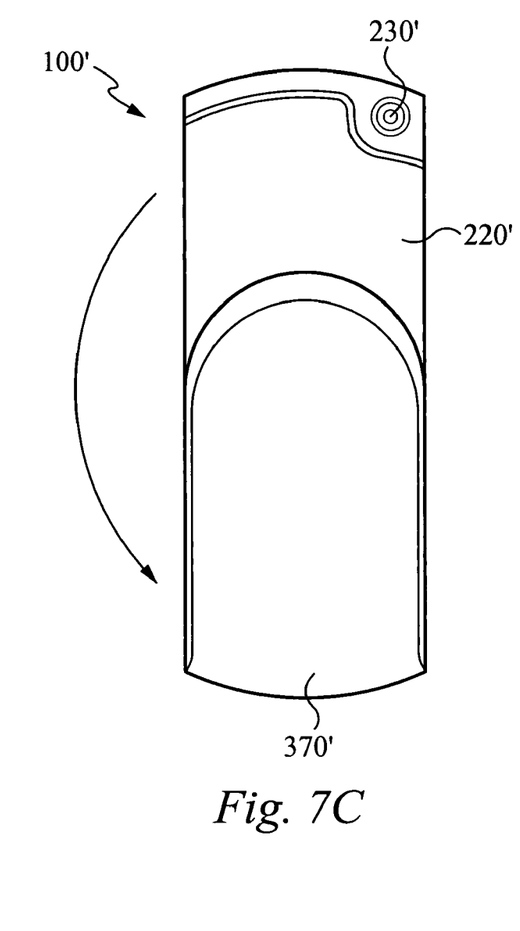

If the user rotates the second panel 370' 180 degrees in relation to the first panel 170 (FIG. 3), in the first direction, the device 100' is now configured to the second position (FIG. 7C). When the device 100' is configured in the second position, the telecommunications device 100' operates in a keyboard mode. While the device 100' operates in the keyboard mode, an entry made on the keyboard 500 (FIG. 5) is displayed on the display 110 (FIG. 5). As shown in FIG. 3 and as described previously, the second panel 370 of the device 100' is rotatably joined to the first panel 170, thus allowing for the second panel 370 to rotate 180 degrees from the first position. FIG. 7C shows the device 100' in the second position, where the second panel 370' is positioned 180 degrees in relation to the back side 220' of the first panel 170 (FIG. 3).

Figure 8:
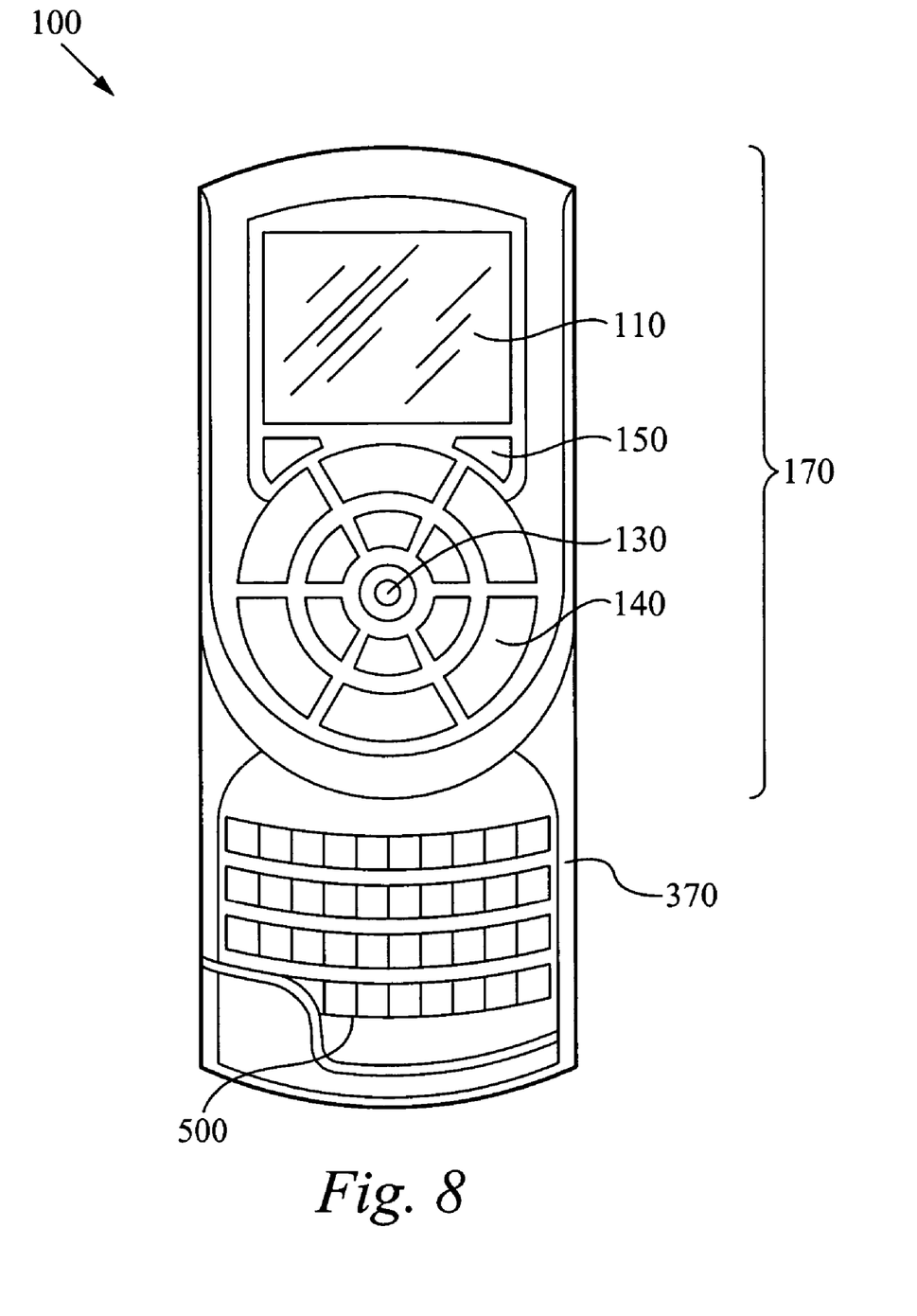
FIG. 8 is a schematic drawing showing a front view of the device when the device is in the second position according to the preferred embodiment.

FIG. 8 shows the front view of the device 100 when the device 100 is in the second position (the open position). In the preferred embodiment, as shown in FIG. 8, the display 110, the control button 130, 130', a numeric keypad 140, 140', the keyboard 500, and function keys 150, 150' are all accessible to the user.

Figure 9A:
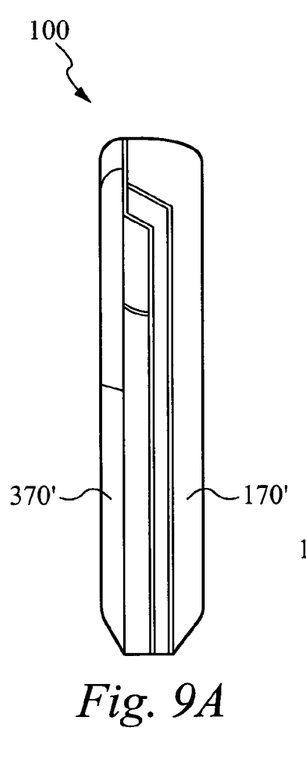
FIGS. 9A, 9B, and 9C are schematic drawings of side views of the embodiment shown in FIG. 8.
Figure 9B:
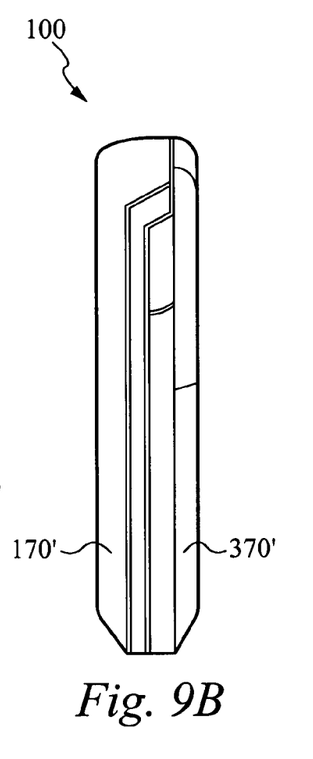
Figure 9C:
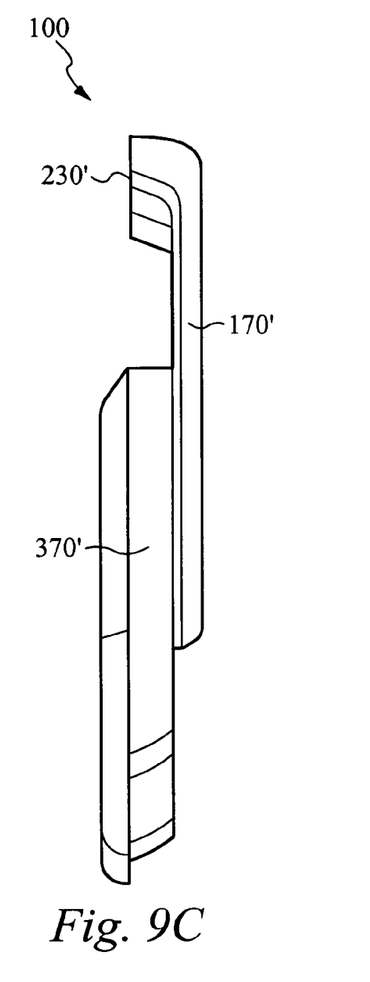

FIGS. 9A, 9B, and 9C show side views of the embodiment in FIG. 8. FIGS. 9A and 9B show side views of the device 100 in the first position (the closed position). FIG. 9C shows a side view of the device 100 when the device 100 is in the second position (the open position).

It will be appreciated by those skilled in the art that the device 100, 100' can further include wireless and/or cable connections to other devices, including but not limited to PC computers, chargers, headphones, PDA devices, cell phone devices, game systems, music listening devices, and the like. Furthermore, it will be appreciated by those skilled in the art that the device 100, 100' can incorporate a tuner, such as a radio tuner, a digital TV tuner chip, a signal frequency tuner, and the like. The device 100, 100' may also include connections, cable, wireless or otherwise, which allow for games and applications to be downloaded and uploaded by the device 100, 100'.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Thus, it will be apparent to those skilled in the art that although the figures of the device indicate that the receiving end is located on the first panel and the engaging end is located on the second panel, the spirit and scope of the invention allows for the engaging end to be located on the first panel and the receiving end to be located on the second panel.

What is claimed is:

1. A multimode electronic communication device comprising:
   a. a first substantially planar panel including a telephone interface and a display on a first face of the first panel, the first panel having a single axis of rotation perpendicular to the first panel;
   b. a second substantially planar panel including a keyboard interface on a first face of the second panel, the first face of the second panel rotatably and operatively coupled to the second face of the first panel for rotation about the axis such that the first panel is configured to rotate in only one plane relative to the second panel such that in a first rotational orientation the keyboard interface is obscured by the first panel, and, in a second rotational orientation the keyboard interface is exposed; and
   c. means for sensing a rotational orientation between the first panel and the second panel such that in the first rotational orientation the device operates as a telephone and input entered on the telephone interface are shown on the display, and, in the second rotational orientation the device operates as a messaging device and input entered on the keyboard interface are shown on the display.

2. A multimode electronic device comprising:
   a. a first substantially planar panel including a first interface and a display on a first face of the first panel and a camera lens on a second face of the first panel, the first panel having a single axis of rotation perpendicular to the first panel;
   b. a second substantially planar panel including a second interface on a first face of the second panel, the first face of the second panel rotatably and operatively coupled to the second face of the first panel for rotation about the axis such that the first panel is configured to rotate in only one plane relative to the second panel such that in a first rotational orientation the second interface is obscured by the first panel and the camera lens is obscured by the second panel, in a second rotational orientation the camera lens is exposed and the second interface is substantially obscured and in a third rotational orientation the second interface is exposed; and
   c. means for sensing a rotational orientation between the first panel and the second panel such that in the first rotational orientation, input entered in response to the first interface are shown on the display, in the second rotational orientation an image in the field of view of the camera lens is visible on the display and in the third rotational orientation input entered in response to the second interface are shown on the display.

3. A multimode wireless communication device comprising:
   a. a first substantially planar panel including a telephone interface and a display on a first face of the first panel and a camera lens on a second face of the first panel, the first panel having a single axis of rotation perpendicular to the first panel;
   b. a second substantially planar panel including a keyboard interface on a first face of the second panel, the first face of the second panel rotatably and operatively coupled to the second face of the first panel for rotation about the axis such that the first panel is configured to rotate in only one plane relative to the second panel such that in a first rotational orientation the keyboard interface is obscured by the first panel and the camera lens is obscured by the second panel, in a second rotational orientation the camera lens is exposed and the keyboard interface is substantially obscured and in a third rotational orientation the keyboard interface is exposed; and
   c. means for sensing a rotational orientation between the first panel and the second panel such that in the first rotational orientation, input entered in response to the telephone interface are shown on the display, in the second rotational orientation an image in the field of view of the camera lens is visible on the display and in the third rotational orientation input entered in response to the keyboard interface are shown on the display.

4. The wireless telecommunications device according to claim 3, wherein when the device is configured in the second rotational orientation, the second panel is rotated about 180 degrees relative to the first rotational orientation.

5. The wireless telecommunications device according to claim 3, wherein the second panel rotates in a first direction from the first rotational orientation toward the second rotational orientation and in a second direction from the first position toward the third rotational orientation, wherein the second direction is opposite to he first direction.

* * * * *

UNITED STATES PATENT AND TRADEMARK OFFICE
CERTIFICATE OF CORRECTION

| | | |
|---|---|---|
| PATENT NO. | : 7,043,284 B2 | Page 1 of 1 |
| APPLICATION NO. | : 10/742886 | |
| DATED | : May 9, 2006 | |
| INVENTOR(S) | : Barbra Tornaghi | |

It is certified that error appears in the above-identified patent and that said Letters Patent is hereby corrected as shown below:

<u>IN THE CLAIMS</u>

In column 10, line 20, claim 5, replace "he" with - the -.

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,043,284 B2 | |
| APPLICATION NO. | : 10/772886 | |
| DATED | : May 9, 2006 | |
| INVENTOR(S) | : Barbra Tornaghi | |

It is certified that error appears in the above-identified patent and that said Letters Patent is hereby corrected as shown below:

IN THE CLAIMS

In column 10, line 20, claim 5, replace "he" with - the -.

This certificate supersedes Certificate of Correction issued August 22, 2006.

Signed and Sealed this

Tenth Day of October, 2006

JON W. DUDAS
*Director of the United States Patent and Trademark Office*